(12) United States Patent
Blaesing et al.

(10) Patent No.: US 7,811,011 B2
(45) Date of Patent: Oct. 12, 2010

(54) CAMERA ARRANGEMENT BEHIND AN INCLINED PANE

(75) Inventors: Frank Blaesing, Werl (DE); Gregor Boehne, Castrop-Rauxel (DE); Carsten Neumann, Dortmund (DE)

(73) Assignee: Leopold Kostal GmbH & Co. KG, Ludenscheid (DE)

( * ) Notice: Subject to any disclaimer, the term of this patent is extended or adjusted under 35 U.S.C. 154(b) by 259 days.

(21) Appl. No.: 12/214,959

(22) Filed: Jun. 24, 2008

(65) Prior Publication Data

US 2008/0279543 A1 Nov. 13, 2008

Related U.S. Application Data

(63) Continuation-in-part of application No. PCT/EP2007/000915, filed on Feb. 2, 2007.

(30) Foreign Application Priority Data

Feb. 6, 2006 (DE) .................. 10 2006 005 168

(51) Int. Cl.
*G03B 17/00* (2006.01)

(52) U.S. Cl. .................. 396/427; 348/151; 359/513

(58) Field of Classification Search .......... 396/427; 359/513

See application file for complete search history.

(56) References Cited

U.S. PATENT DOCUMENTS

| | | | | |
|---|---|---|---|---|
| 4,863,130 A | * | 9/1989 | Marks, Jr. | ........ 248/206.3 |
| 6,259,359 B1 | | 7/2001 | Fujinami et al. | |
| 6,564,122 B1 | | 5/2003 | Huertgen et al. | |
| 6,738,088 B1 | * | 5/2004 | Uskolovsky et al. | ........ 348/148 |
| 6,799,904 B2 | | 10/2004 | Schaefer et al. | |
| 7,304,680 B2 | | 12/2007 | Kohler et al. | |
| 7,322,755 B2 | | 1/2008 | Neumann et al. | |
| 7,348,586 B2 | * | 3/2008 | Ishikawa et al. | .......... 250/573 |
| 7,438,774 B2 | * | 10/2008 | Kurfiss et al. | .......... 156/64 |
| 7,497,632 B2 | * | 3/2009 | Kajino et al. | .......... 396/427 |
| 7,609,961 B2 | * | 10/2009 | Park | .......... 396/429 |
| 7,697,028 B1 | * | 4/2010 | Johnson | .......... 348/148 |
| 2002/0075387 A1 | | 6/2002 | Janssen | |
| 2003/0010890 A1 | * | 1/2003 | Sakata | .......... 250/203.2 |
| 2003/0095182 A1 | * | 5/2003 | Imoto | .......... 348/148 |
| 2004/0032668 A1 | | 2/2004 | Schaefer et al. | |
| 2004/0202380 A1 | | 10/2004 | Kohler et al. | |
| 2007/0041725 A1 | | 2/2007 | Neumann et al. | |
| 2007/0132610 A1 | * | 6/2007 | Guernalec et al. | ........ 340/932.2 |

FOREIGN PATENT DOCUMENTS

| | | |
|---|---|---|
| DE | 44 46 124 A1 | 8/1995 |
| DE | 100 17 072 A1 | 10/2000 |
| DE | 199 25 584 A1 | 12/2000 |
| DE | 100 59 315 A1 | 6/2002 |
| DE | 101 32 982 A1 | 1/2003 |
| DE | 102 37 608 A1 | 2/2004 |
| DE | 103 42 837 A1 | 4/2005 |
| DE | 10 2004 024 735 A1 | 12/2005 |
| WO | WO 02/078346 A1 | 10/2002 |

* cited by examiner

*Primary Examiner*—W. B. Perkey
*Assistant Examiner*—Linda B Smith
(74) *Attorney, Agent, or Firm*—Brooks Kushman P.C.

(57) ABSTRACT

A camera arrangement includes a camera having a lens pointed at a pane and being separated from the pane. A light-guiding element is between the camera lens and the pane. The light-guiding element guides at least light which is incident on the pane in a grazing manner from a direction of incidence to the camera.

20 Claims, 1 Drawing Sheet

CAMERA ARRANGEMENT BEHIND AN INCLINED PANE

CROSS-REFERENCE TO RELATED APPLICATIONS

This is a continuation-in-part of International Application PCT/EP2007/000915, published in German, with an international filing date of Feb. 2, 2007, which claims priority to DE 10 2006 005 168.8, filed Feb. 6, 2006; the disclosures of which are both hereby incorporated by reference.

BACKGROUND OF THE INVENTION

1. Field of the Invention

The present invention relates to a camera arrangement having a camera directed onto a pane with a light-guiding element being between the camera and the pane.

2. Background Art

A camera arrangement includes a camera and a pane. The pane separates an outside region from an inside region. For example, the pane is a vehicle window pane such that the outside region is the environment outside of the vehicle and the inside region is the vehicle interior. The camera is located in the inside region (i.e., behind the pane) for protection from the outside region and is directed towards the pane to detect images in the outside region (i.e., to detect light rays incident to the pane). The detection region of the camera is a function of the optics of the camera and the configuration of the arrangement. Because of space requirements of the camera, it is generally not possible to align the camera relative to the pane such that the detection region extends along the surface of the pane. Consequently, the camera has a blind region in which the camera cannot detect light rays which are incident to the pane at an angle nearly parallel to the surface of the pane (i.e., light rays which have a glancing angle of incidence).

U.S. Pat. No. 7,322,755, which is hereby incorporated by reference, describes a camera arrangement having a camera and a pane. A light-guiding element fills the space between the camera and the pane. The camera may be cast within the light-guiding element. The camera arrangement is configured such that the camera has a detection region along a horizontal viewing direction. Due to the refractive properties of the transmitting medium (e.g., air on the outer region of the pane, the pane, the light-guiding element), light rays incident onto the pane at shallow angles (i.e., at angles between the normal angle of incidence and glancing angles of incidence) are deflected in the direction of the camera.

SUMMARY OF THE INVENTION

An object of the present invention is a camera arrangement having a camera directed onto a pane in which the camera has a detection region large enough to detect light rays which are incident to the pane at angles nearly parallel to the surface of the pane such that the camera can detect objects located in a viewing direction nearly parallel to the surface of the pane through which light passes. Consequently, the camera has a relatively reduced blind angle such that the camera can detect objects visible in the neighborhood of the surface of the pane (i.e., the camera is capable of imaging the detection of objects at a shallow (i.e., glancing) angle with respect to the surface of the pane).

In carrying out the above object and other objects, the present invention provides a camera arrangement having a camera and a light-guiding element. The camera has a lens pointed at a pane and separated from the pane. The light-guiding element is between the camera lens and the pane. The light-guiding element guides at least light which is incident on the pane in a grazing manner from a direction of incidence to the camera.

Further, in carrying out the above object and other objects, the present invention provides another camera arrangement having a camera and a light-guiding element. The camera includes a lens pointed at a pane and separated from the pane. The pane divides an outside region from an inside region with the camera being in the inside region. The light-guiding element is between the camera lens and the pane. The light-guiding element guides light from the outside region that is incident to the pane and is substantially perpendicular to the normal of the pane to the camera lens.

Also, in carrying out the above object and other objects, the present invention provides another camera arrangement having a camera and a light-guiding element. The camera includes a lens pointed at a pane and separated from the pane. The pane divides an outside region from an inside region with the camera being in the inside region. The light-guiding element is between the camera lens and the pane. The light-guiding element guides light from the outside region that is incident to the pane and is substantially parallel with the pane to the camera lens.

In embodiments of the present invention, a light-guiding element guides light incident on the pane, at least from a glancing angle of incidence, to the camera.

A light ray incident on a pane having parallel faces from a non-perpendicular direction continues to pass in the direction of incidence, having undergone a slight parallel displacement after passing through the pane, because the refraction of the light ray toward the perpendicular at the point of entry into the pane is cancelled by refraction away from the perpendicular as the light ray exits the pane. Thus, the angular region detected by a camera through the pane is insignificantly altered. For various reasons such as minimizing space requirements, prevention of reflections on the inner sides of the panes, protection against vandalism and environmental effects, etc., it is necessary to mount the camera near the pane and to screen the camera and the region of light passage between camera and the pane by a housing. These requirements can generally be fulfilled in cases where the camera points almost perpendicularly through the pane. However, when a part of the outside space near the pane surface is to be detected, the camera must be pointed at a shallow angle to the plane. This is often disadvantageous due to the space requirement of the camera and the resulting large screening.

In embodiments of the present invention, a light-guiding element is between the camera and the pane. The light-guiding element include a prism or a combination of prisms. The light-guiding element cancels the refraction effect behind the pane such that light rays emanating from a comparatively large angular region in front of the pane are transmitted into a comparatively small angular region behind the pane and can thus be detected by the camera.

In an embodiment of the present invention, the light-guiding element and the pane are integrally joined together. In another embodiment of the present invention, the pane is formed integrally with the light-guiding element. The external surface of the pane is thereby formed by the outer surface of the light-guiding element, which is mostly designed to be flat. The light-guiding element thus fulfills the pane function of separating inner and outer regions.

DETAILED DESCRIPTION OF THE PREFERRED EMBODIMENT(S)

Figure 1:
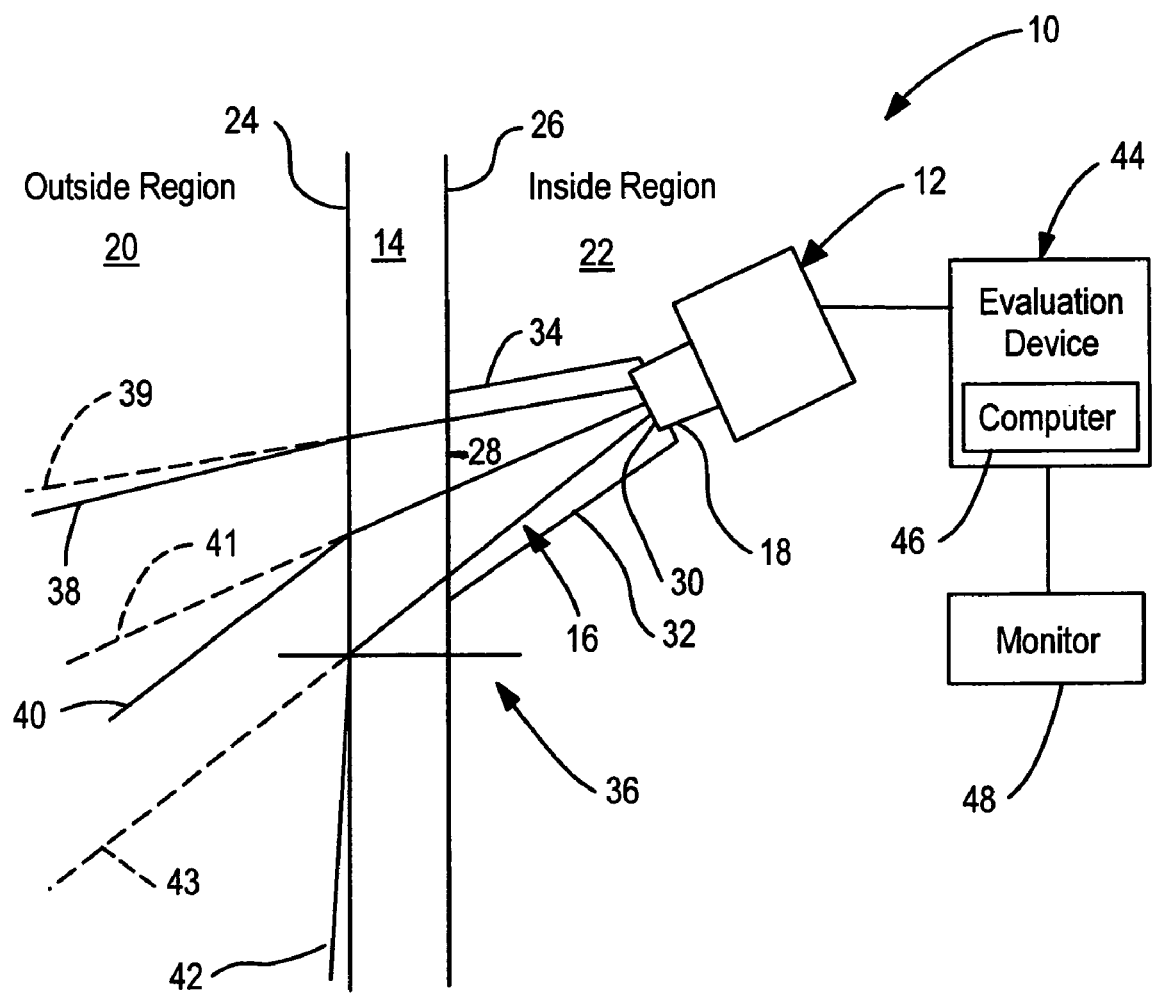
FIG. 1 illustrates a schematic representation of a camera arrangement in accordance with an embodiment of the present invention.

Referring now to FIG. 1, a schematic representation of a camera arrangement 10 in accordance with an embodiment of the present invention is shown. Camera arrangement 10 includes a camera 12, a pane 14, and a light-guiding element 16. Camera 12 includes a lens 18. Pane 14 separates an outside region 20 from an inside region 22. Pane 14 has an outer surface 24 facing outside region 20 and an inner surface 26 facing inside region 22. Outer and inner surfaces 24, 26 of pane 14 are parallel to one another such that pane 14 is a flat parallel pane. Pane 14 may be a window pane of a vehicle or a building.

Camera 12 is arranged in inside region 22 with camera lens 18 being oriented in a slanted direction towards pane 14. Light-guiding element 16 is arranged between camera 12 and pane 14. Forward side 28 of light-guiding element 16 is connected to inner surface 26 of pane 14 and opposite rearward side 30 of light-guiding element 16 is connected to camera lens 18. The connections of light-guiding element 16 to inner surface 26 of pane 14 and to camera lens 18 is as seamless as possible.

Light-guiding element 16 includes a prism or a combination of prisms. Light-guiding element 16 has a refraction index that is substantially the same as the refraction index of pane 14. Preferably, pane 14 and light-guiding element 16 are made of the same material. For example, pane 14 is a glass pane and light-guiding element 16 is a glass prism. Edge surfaces 32 and 34 of light-guiding element 16 may be colored mat black to prevent distracting reflections and penetration by ambient light.

Pane 14 and light-guiding element 16 may be formed integrally with one another. Similarly, light-guiding element 16 and camera lens 18 may be formed integrally with one another. Other configurations for fabricating and designing camera arrangement 10 in which camera 12 is connected to pane 14 via a light-guiding element 16 are described in U.S. Pat. No. 7,322,755, which is hereby incorporated by reference.

Camera 12 located on inside region 22 is intended to record an image of outside region 20 passing through pane 14. As shown in FIG. 1, light rays incident on camera lens 18 from outside region 20 are refracted during transition. The angle of refraction depends on the incident angle of light rays impinging on pane 14. As an example of light ray trajectories, FIG. 1 illustrates (as continuous lines) three light rays 38, 40, 42 incident on camera lens 18. FIG. 1 further illustrates (as dashed lines) the apparent light paths 39, 41, 43 and thus the directions from which corresponding light rays 38, 40, 42 appear to originate by straight line propagation, i.e., without refraction. The difference between the actual (38, 40, 42) and corresponding apparent (39, 41, 43) light ray trajectories are manifested by a distortion of the image detected by camera lens 18. The difference between the actual trajectory and apparent trajectory of a light ray becomes larger as the angle of incidence, measured with respect to the normal 36 of pane 14, of the light ray becomes larger. For instance, the difference between the actual trajectory of light ray 38 and its apparent trajectory 39 is relatively small as light ray 38 has a relatively small angle of incidence relative to pane normal 36 whereas the difference between the actual trajectory of light ray 42 and its apparent trajectory 43 is relatively large as light ray 42 has a relatively large angle of incidence relative to pane normal 36.

As further seen in FIG. 1, light rays (e.g., light ray 42) which fall onto pane 14 at a glancing angle (i.e., at an angle that is almost perpendicular to pane normal 36 or, put another way, at an angle that is almost parallel with outer surface 24 of pane 14) are deflected by light-guiding element 16 into camera lens 18. This feature of camera 12 being able to detect an image from directions that are almost parallel to the surface of pane 14 is made possible by light-guiding element 16 in conjunction with camera 12 being tilted with respect to pane 14 as shown in FIG. 1.

Camera arrangement 10 further includes an evaluation device 44. Evaluation device 44 is connected to camera 12 for receiving a camera signal indicative of the image detected by camera 12. Evaluation device 44 processes the camera signal for display on a monitor 48. Evaluation device 44 can be integrated in camera 12. Evaluation device 44 includes a computer 46 or the like for processing the signal output to equalize the image detected by camera 12.

Numerous advantageous applications are possible for the image acquisition process described here. For example, pane 14 can be a window pane of a building with camera 12 and light-guiding element 16 being attached to pane 14 and thereby being protected inside the building. Camera 12 enables the monitoring of the area below pane 14 without camera 12 being accessible or even visible from outside region 20. Thus, for example, camera 12 arranged above a door can be pointed downward at a steep angle and thereby cover the region directly in front of the door.

Pane 14 can likewise be a side window of a vehicle. In this case, FIG. 1 indicating a view from above onto the edge of side window 14. Camera 12 initially detects a side region of the vehicle, while the incident direction parallel to pane 14 can be provided for detecting the rear side of the vehicle. Camera 12 thereby assumes the function of a side mirror characterized by an extremely small blind spot.

In addition, camera arrangement 10 can be located on the rear window of a vehicle, whereby it is possible to achieve a wide view of the rear vehicle region, for example, as a backup or parking aid, or for monitoring a trailer hitch.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A camera arrangement comprising:
   a camera having a lens pointed at a pane and being separated from the pane such that a space is between the camera lens and the pane; and
   a light-guiding element filling the space between the camera lens and the pane, wherein the light-guiding element connects the camera to the pane with a first side of the light-guiding element being connected to the pane and an opposite side of the light-guiding element being connected to the camera, wherein the light-guiding element is a prism and guides at least light which is incident on the pane in a grazing manner from a direction of incidence to the camera lens.

2. The arrangement of claim 1 wherein the pane is substantially straight, wherein:
the camera lens is tilted relative to the normal of the pane.

3. The arrangement of claim 1 wherein:
the light-guiding element has a refraction index different than the refraction index of air.

4. The arrangement of claim 1 wherein:
the light-guiding element has a refraction index substantially similar to the refraction index of the pane.

5. The arrangement of claim 1 wherein:
the light-guiding element and the pane are of the same material.

6. The arrangement of claim 1 wherein the pane is a glass pane, wherein:
the light-guiding element is a glass light-guiding element.

7. The arrangement of claim 1 wherein:
the light-guiding element further has side surfaces which are opaque.

8. The arrangement of claim 1 wherein:
the first side of the light-guiding element is integrally bonded to the pane.

9. The arrangement of claim 1 wherein:
the first side of the light-guiding element is integrally formed to the pane such that the light-guiding element and the pane are a single piece.

10. The arrangement of claim 1 further comprising:
an evaluation device for evaluating images detected by the camera.

11. The arrangement of claim 10 wherein:
the evaluation device displays the images detected by the camera on a monitor.

12. The arrangement of claim 10 wherein:
the evaluation device equalizes the images detected by the camera for displaying the detected images.

13. The arrangement of claim 1 wherein the pane is a vehicle pane, wherein:
the camera is located in the vehicle interior for viewing vehicle surroundings.

14. The arrangement of claim 1 wherein the pane is a building pane, wherein:
the camera located in the building interior for viewing building surroundings.

15. A camera arrangement comprising:
a camera having a lens pointed at a pane and being separated from the pane such that a space is between the camera lens and the pane, wherein the pane divides an outside region from an inside region with the camera being in the inside region; and
a light-guiding element filling the space between the camera lens and the pane, wherein the light-guiding element connects the camera to the pane with a first side of the light-guiding element being connected to the pane and an opposite side of the light-guiding element being connected to the camera, wherein the light-guiding element is a prism and guides light from the outside region that is incident to the pane and is substantially perpendicular to the normal of the pane to the camera lens.

16. The arrangement of claim 15 wherein:
the camera lens is tilted relative to the normal of the pane.

17. The arrangement of claim 15 wherein:
the camera lens is tilted in a first direction relative to the normal of the pane at a first angle;
wherein the light-guiding element guides light from the outside region that is incident to the pane in the first direction and has a second angle substantially perpendicular to the normal of the pane to the camera lens, wherein the second angle is greater than the first angle.

18. A camera arrangement comprising:
a camera having a lens pointed at a pane and being separated from the pane such that a space is between the camera lens and the pane, wherein the pane divides an outside region from an inside region with the camera being in the inside region; and
a light-guiding element filling the space between the camera lens and the pane, wherein the light-guiding element connects the camera to the pane with a first side of the light-guiding element being connected to the pane and an opposite side of the light-guiding element being connected to the camera, wherein the light-guiding element is a prism and guides light from the outside region that is incident to the pane and is substantially parallel with the pane to the camera lens.

19. The arrangement of claim 18 wherein:
the camera lens is slanted relative to the normal of the pane.

20. The arrangement of claim 18 wherein:
the light-guiding element has a refraction index substantially similar to the refraction index of the pane.

* * * * *